(12) United States Patent
Zustak et al.

(10) Patent No.: US 9,912,930 B2
(45) Date of Patent: Mar. 6, 2018

(54) PROCESSING VIDEO SIGNALS BASED ON USER FOCUS ON A PARTICULAR PORTION OF A VIDEO DISPLAY

(71) Applicants: Frederick J. Zustak, Poway, CA (US); Brant Candelore, San Diego, CA (US); Graham Clift, Poway, CA (US); Kazumoto Kondo, San Diego, CA (US); Steven Martin Richman, San Diego, CA (US)

(72) Inventors: Frederick J. Zustak, Poway, CA (US); Brant Candelore, San Diego, CA (US); Graham Clift, Poway, CA (US); Kazumoto Kondo, San Diego, CA (US); Steven Martin Richman, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 719 days.

(21) Appl. No.: 13/794,000

(22) Filed: Mar. 11, 2013

(65) Prior Publication Data

US 2014/0253694 A1    Sep. 11, 2014

(51) Int. Cl.
| | |
|---|---|
| H04N 5/225 | (2006.01) |
| H04N 13/00 | (2018.01) |
| H04N 13/04 | (2006.01) |
| H04N 21/4223 | (2011.01) |
| H04N 21/431 | (2011.01) |
| H04N 21/44 | (2011.01) |

(Continued)

(52) U.S. Cl.
CPC ....... *H04N 13/0018* (2013.01); *H04N 5/2252* (2013.01); *H04N 13/0484* (2013.01); *H04N 21/4223* (2013.01); *H04N 21/4318* (2013.01); *H04N 21/44008* (2013.01); *H04N 21/4621* (2013.01); *H04N 21/4728* (2013.01)

(58) Field of Classification Search
CPC .............. G02B 27/0093; G02B 27/017; G02B 27/2278; G02B 5/32; G02F 1/1334; G02F 1/13342; G02F 2201/305; G06F 1/1616; G06F 1/1641; G06F 1/1643; G06F 2203/04803; G06F 3/0481; G06F 3/0483; G06F 3/04883
See application file for complete search history.

(56) References Cited

U.S. PATENT DOCUMENTS 5,912,721 A * 6/1999 Yamaguchi .......... G06K 9/0061
                                                              351/209
6,028,608 A * 2/2000 Jenkins ................. G06T 1/0021
                                                              345/619

(Continued)

FOREIGN PATENT DOCUMENTS

CN          1666222 A       9/2005
WO       WO03/013153    *  2/2003
(Continued)

*Primary Examiner* — Jayanti K Patel
*Assistant Examiner* — Shadan E Haghani
(74) *Attorney, Agent, or Firm* — John L. Rogitz

(57) ABSTRACT

Devices and methods are disclosed for detecting a focus of at least one viewer as being directed to a particular region of a video display. A first portion of a frame of video for presentation in the region of the viewer's focus is processed differently than another portion of the frame of video related to a region that is not part of the viewer's focus.

16 Claims, 5 Drawing Sheets

System

(51) Int. Cl.
    *H04N 21/462*    (2011.01)
    *H04N 21/4728*   (2011.01)

(56)            References Cited

U.S. PATENT DOCUMENTS

| | | | |
|---|---|---|---|
| 6,198,849 B1* | 3/2001 | Fischer | H04N 7/54 |
| | | | 348/404.1 |
| 6,766,044 B1* | 7/2004 | Tsujii | G06T 9/007 |
| | | | 378/62 |
| 6,990,246 B1* | 1/2006 | Ferguson | H04N 19/172 |
| | | | 375/E7.037 |
| 2001/0013960 A1* | 8/2001 | Popovich et al. | 359/15 |
| 2002/0141650 A1* | 10/2002 | Keeney | H04N 19/115 |
| | | | 382/239 |
| 2003/0113098 A1* | 6/2003 | Willis | 386/68 |
| 2003/0169935 A1* | 9/2003 | Sano | G06T 3/4084 |
| | | | 382/240 |
| 2003/0226968 A1 | 12/2003 | Montellese | |
| 2004/0010803 A1* | 1/2004 | Berstis | H04N 5/23206 |
| | | | 725/105 |
| 2005/0002645 A1* | 1/2005 | Furukawa et al. | 386/68 |
| 2005/0129387 A1* | 6/2005 | Kishi | H04N 5/783 |
| | | | 386/344 |
| 2005/0179875 A1 | 8/2005 | Aoyanagi | |
| 2006/0176951 A1* | 8/2006 | Berman et al. | 375/240.01 |
| 2007/0115261 A1 | 5/2007 | Cho et al. | |
| 2008/0036875 A1* | 2/2008 | Jones | H04N 5/23238 |
| | | | 348/222.1 |
| 2008/0074444 A1* | 3/2008 | Morikawa et al. | 345/660 |
| 2009/0300692 A1* | 12/2009 | Mavlankar et al. | 725/94 |
| 2010/0060781 A1 | 3/2010 | Yumiki et al. | |
| 2010/0149073 A1* | 6/2010 | Chaum et al. | 345/8 |
| 2011/0234481 A1 | 9/2011 | Katz et al. | |
| 2012/0146891 A1* | 6/2012 | Kalinli | 345/156 |
| 2012/0327061 A1* | 12/2012 | Sirpal et al. | 345/211 |
| 2013/0070109 A1* | 3/2013 | Gove | H04N 5/347 |
| | | | 348/207.1 |
| 2013/0112752 A1* | 5/2013 | Negro | G06K 7/10722 |
| | | | 235/472.01 |
| 2014/0023351 A1* | 1/2014 | Kaburlasos | H04N 21/4728 |
| | | | 386/353 |

FOREIGN PATENT DOCUMENTS

| | | |
|---|---|---|
| WO | 2012020410 A2 | 2/2012 |
| WO | 2012023004 A1 | 2/2012 |

* cited by examiner

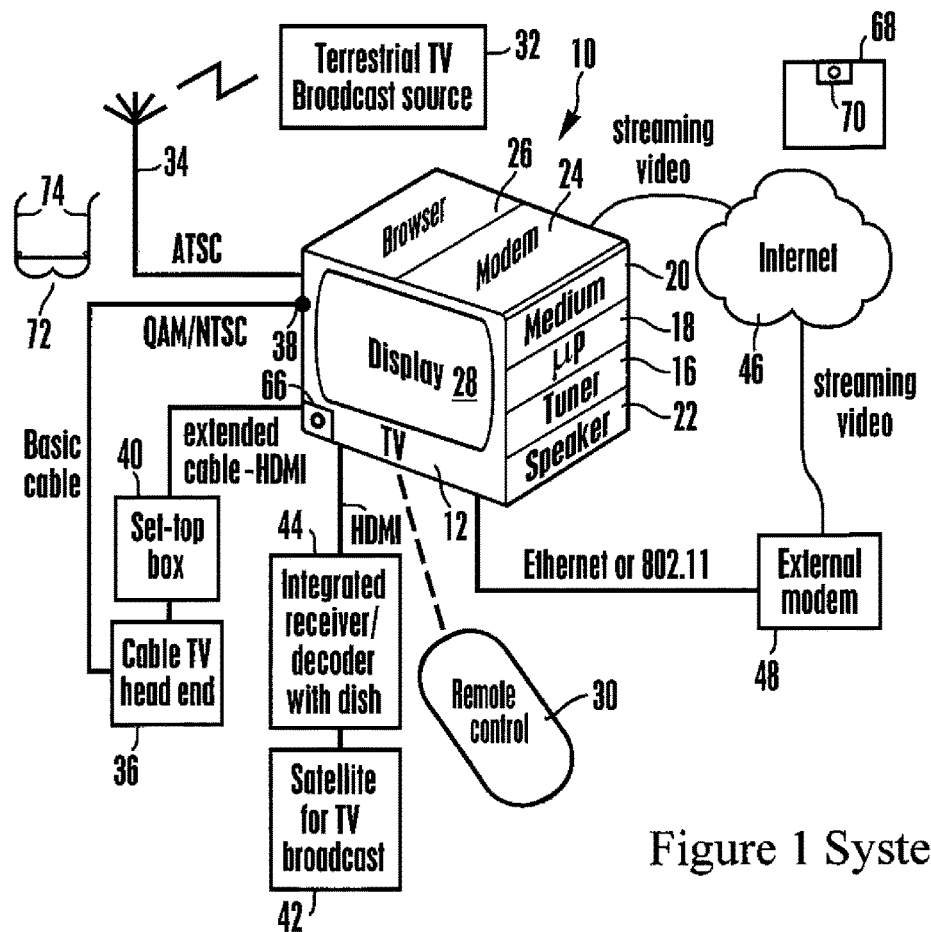
Figure 1 System
Figure 2 TV
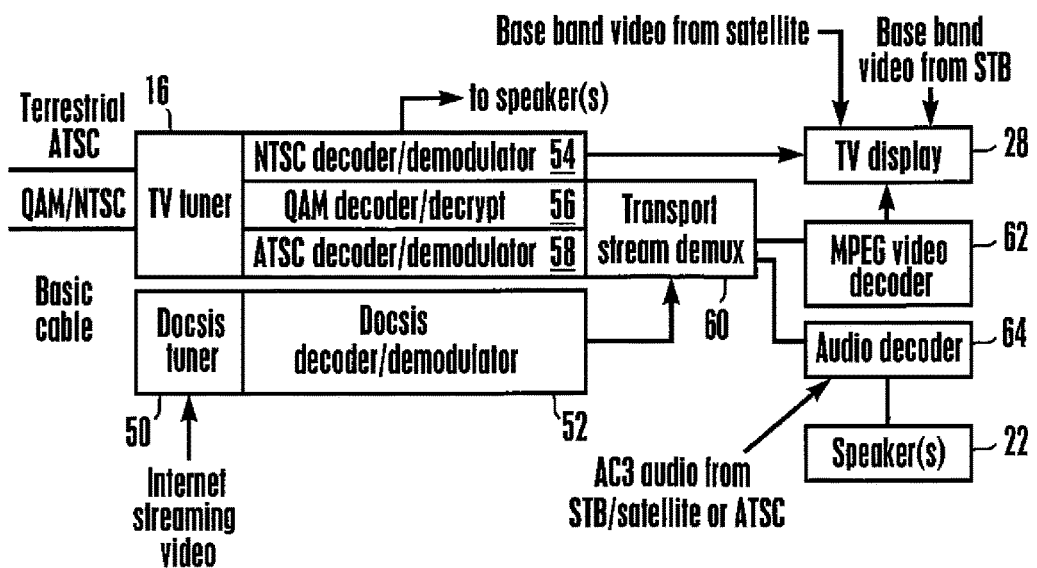

PROCESSING VIDEO SIGNALS BASED ON USER FOCUS ON A PARTICULAR PORTION OF A VIDEO DISPLAY

FIELD OF THE INVENTION

The present application relates generally to processing video signals for display devices such as TVs, and in particular for ultra-high definition (UHD) TVs.

BACKGROUND OF THE INVENTION

High Definition (HD) displays have been introduced which have greater resolution than standard definition (SD) displays. This is achieved by increasing the pixel density from the standard 640 or 720 pixels per line, with 480 lines (720×480), to the HD 1920×1080 (for progressive and interlaced scans) 1440×1080 (for older interlaced scans). The greater resolution produces a clearer, more detailed visual presentation.

Recently, ultra high definition (UHD) displays have been introduced with even greater resolution than HD. As understood herein, the resolution of these displays lends itself to enhanced user experiences.

SUMMARY OF THE INVENTION

As understood herein, it may sometimes be difficult or impossible for a display device's processing components to, e.g., fully and efficiently decode all portions of an incoming UHD audio video (AV) signal as intended such that, e.g., video is seamlessly presented in UHD format in the best possible refresh rate and screen resolution based on the display's capabilities. This may be due to, e.g., the device's inability (e.g., insufficient resources) to process such a voluminous amount of data at the relatively fast rate at which it is received. Accordingly, present principles understand the desirability of presenting at least the portion of the video on the display where a viewer's attention is particularly focused in the best possible refresh rate and screen resolution based on the device's capabilities.

Accordingly, in one aspect a method includes detecting that a focus of at least one viewer is on a first video display region of a video display also having at least a second video display region. The method also includes decoding a first portion of a frame of video for presentation in the first video display region differently than a second portion of the frame of video responsive to detecting the focus of at least one viewer is on the first video display region. Thus, in some embodiments, the first portion may be decoded at a faster rate than the second portion. Also in some embodiments, the second portion may or may not be decoded at all.

Further still, in exemplary embodiments the detecting includes imaging at least one eye of a viewer. The imaging may include using a camera juxtaposed with the display to generate images of the viewer's eyes, and/or may include using a camera mounted on eyewear worn by the user to generate images of the viewer's eyes.

In another aspect, an apparatus configured to receive, from a camera, images of eyes of a viewer of a display includes a video display defining plural video display regions. The apparatus also includes a processor configured for controlling the video display and for receiving images from the camera of eyes of at least one viewer of the video display. The processor is also configured to process a first portion of a frame of video using a first processing and process a second portion of the frame using a second processing responsive to the images received from the camera.

In still another aspect, an audio video display device includes a video display and a processor configured to receive demanded images and present the demanded images on the video display. The processor is also configured to present a first portion of the demanded images in greater resolution and/or at a greater refresh rate than a second portion of the demanded images responsive to a determination that a viewer is focused on a region of the display corresponding to the first portion.

In another aspect of the invention, an audio video display device is able to detect the distance that a viewer is away from the device. If a viewer is too far away to discern detail in the video, then the resolution of the entire image is lowered. Co-pending U.S. patent application Ser. No. 13/658,272, filed Oct. 23, 2012, titled ADAPTING LAYOUT AND TEXT FONT SIZE FOR VIEWER DISTANCE FROM TV, is incorporated herein by reference and explains multiple ways to measure determine a viewer's distance from a TV.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a block diagram of an example TV;

DETAILED DESCRIPTION OF THE PREFERRED EMBODIMENT

Figure 3:
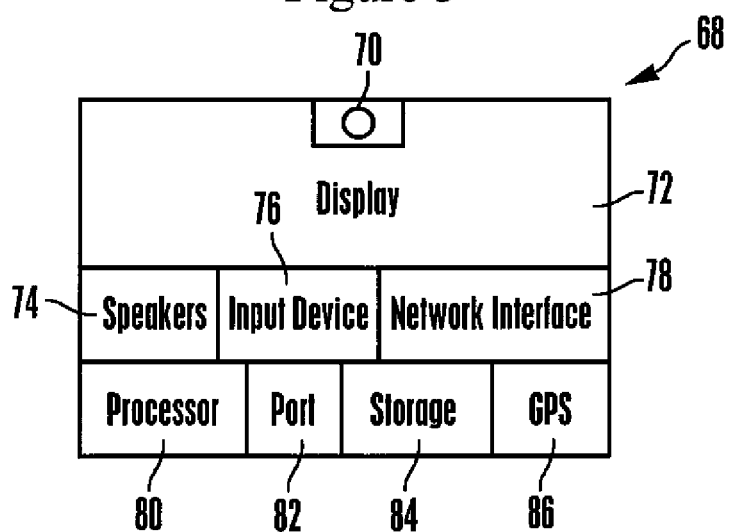
FIG. 3 is a block diagram of an example tablet computer.

Referring initially to the non-limiting example embodiment show in FIG. 1, a system 10 includes an audio video device (AVD) such as a TV 12 including a TV tuner 16 communicating with a TV processor 18 accessing a tangible computer readable storage medium 20 such as disk-based or solid state storage. While the example AVD is embodied as a TV, present principles apply to other AVDs as well, e.g., home theaters, game consoles, computing devices, etc.

The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28, which may be a two dimensional (2D) for presenting 2D images, and/or three dimensional (3D) display for presenting both 2D images and 3D images (it thus being understood that the images and frames described herein may be either 2D or 3D). In the example shown the display 28 is a 2160 p (progressive scan) display with a resolution of 3840×2160 pixels (for 4K UHD) or 4320 p (progressive scan) display with a resolution of 7860×4320 pixels (for 8K UHD). Frame rates for the UHD display 28 can be, e.g., 24, 25, 50, 60, or 120 frames per second. 16K UHD devices are being prototyped. And even larger displays are possible by combining more display panels together.

User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

In addition, note that the TV 12 also includes a camera 66 that may be a digital camera. The camera 66 may be integrated into a TV 12 and may be controllable by the processor 18 to gather pictures/images and video of viewers of the TV 12 in accordance with present principles, and/or may physically separate from the TV 12 but nonetheless in communication therewith to provide images to the processor 18.

A tablet computer 68 is also shown in FIG. 1. The tablet computer 68 includes a camera 70 that may be, e.g., a digital camera such as a webcam. The tablet 68 will be described in more detail below in reference to FIG. 3, but is understood to be in (e.g., wireless) communication with the TV 12 over a network such as, e.g., the Internet 46 to provide images from the camera 70 to the TV 12 in accordance with present principles.

Still in reference to FIG. 1, the system 10 further includes eyewear 72 (e.g., glasses) including cameras 74 that may be digital cameras. The eyewear 72 is understood to be in (e.g., wireless) communication with the TV 12 over a network such as, e.g., the Internet 46 to provide images from the cameras 74 to the TV 12 in accordance with present principles. The eyewear 72 will be described in more detail in reference to FIG. 4.

Now in reference to FIG. 2, it shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Turning to FIG. 3, the tablet computer 68 referenced above is shown. The tablet computer 68 is understood to be operable to undertake present principles as described further below. However, it is to be further understood that devices other than a tablet computer, such as other portable and/or personal electronic devices, may be used to undertake present principles and may include some or all of the components included in the tablet computer 68. For instance, other devices that may be used are, e.g., smart phones, music players, smart watches, personal digital assistants (PDAs), laptop and desktop computers, e-readers such as electronic books, and indeed other televisions including Internet-enabled and smart TVs, mini TVs, etc.

Regardless, describing FIG. 3 with more specificity, the tablet computer 68 includes a touch enabled display 72, one or more speakers 74 for outputting audio, and an additional input device 76 such as, e.g., a track pad or an audio receiver/microphone for receiving voice commands and input in accordance with present principles. The tablet computer 68 also includes a network interface 78 for communication over at least one network such as the Internet 46, an WAN, an LAN, etc. under control of a processor 80, it being understood that the processor 80 controls the tablet computer 68 including, e.g., the display 72 to present images and the speakers 74 to present audio. The network interface 78 may be, e.g., a wired or wireless modem or router, or other appropriate interface such as, e.g., a wireless telephony transceiver. In addition, the tablet computer 68 includes an input port 82 such as, e.g., a USB port, and a tangible computer readable storage medium 84 such as disk-based or solid state storage. Moreover, a GPS receiver 86 is included on the tablet computer 68 and is configured to receive geographic position information from at least one satellite and provide the information to the processor 80, though it is to be understood that another suitable position receiver other than a GPS receiver may be used in accordance with present principles.

Also shown in FIG. 3 is at least one camera 70 included on the tablet computer 68 that may be, e.g., a digital camera. The camera 70 is understood to be operable under control of the processor 80 to communicate with the TV 12 (e.g., the TV's processor 18) to thus provide images to the TV 12 via, e.g., the network interface 78 over the Internet 46 or any other suitable network.

Figure 4:
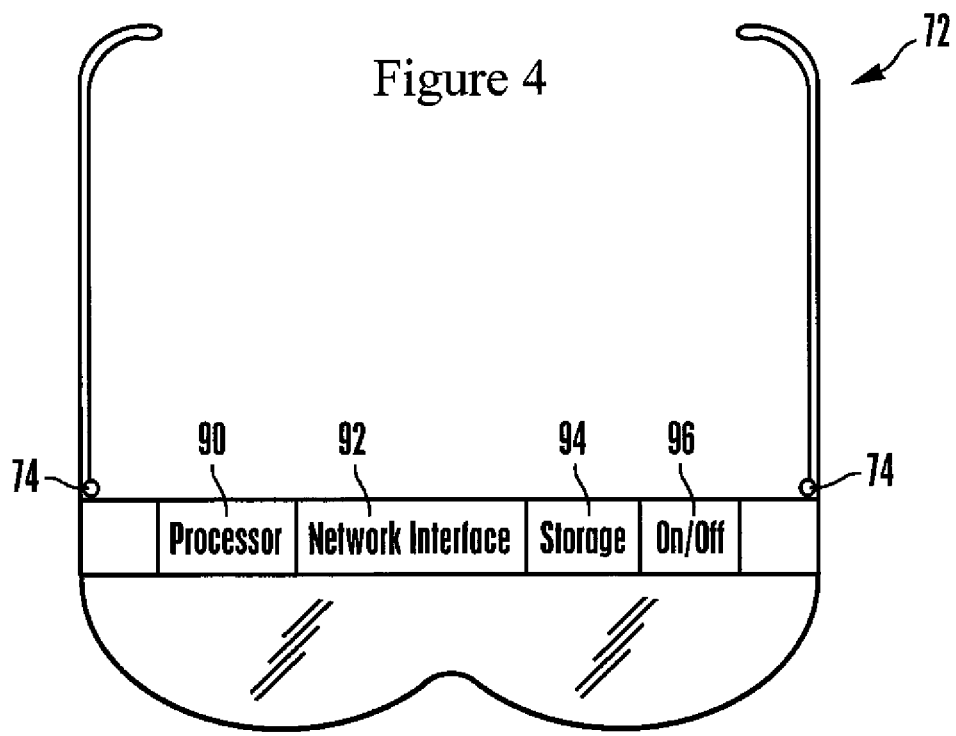
FIG. 4 is a block diagram of exemplary eyewear including at least one digital camera.

Now in reference to FIG. 4, a block diagram of exemplary eyewear 72 including plural digital cameras 74 is shown. The cameras 74 are understood to be under control of and in communication with an eyewear processor 90 to provide images thereto. The eyewear 72 also includes a network interface 92 for communication over at least one network such as the Internet 46, an WAN, an LAN, etc. under control of the processor 90, it being understood that the processor 90 controls the eyewear components including, e.g., the cameras 74 mounted thereon. The network interface 92 may be, e.g., a wired or wireless modem or router, or other appropriate interface such as, e.g., a wireless telephony transceiver. Thus, the cameras 74 are understood to be operable under control of the processor 90 to communicate with the TV 12 (e.g., the TV's processor 18) to provide images to the TV 12 via, e.g., the network interface 92 over the Internet 46 or any other suitable network in accordance with present principles.

FIG. 4 also shows that the eyewear 72 optionally includes lenses 88 through which a viewer may look when wearing the eyewear 72, as well as a tangible computer readable storage medium 94 such as disk-based or solid state storage and an on/off switch 96 that may be toggled from an off position to an on position and vice versa to thereby energize and deenergize electronic components of the eyewear 72, such as the camera 74 and processor 90.

Figure 5:
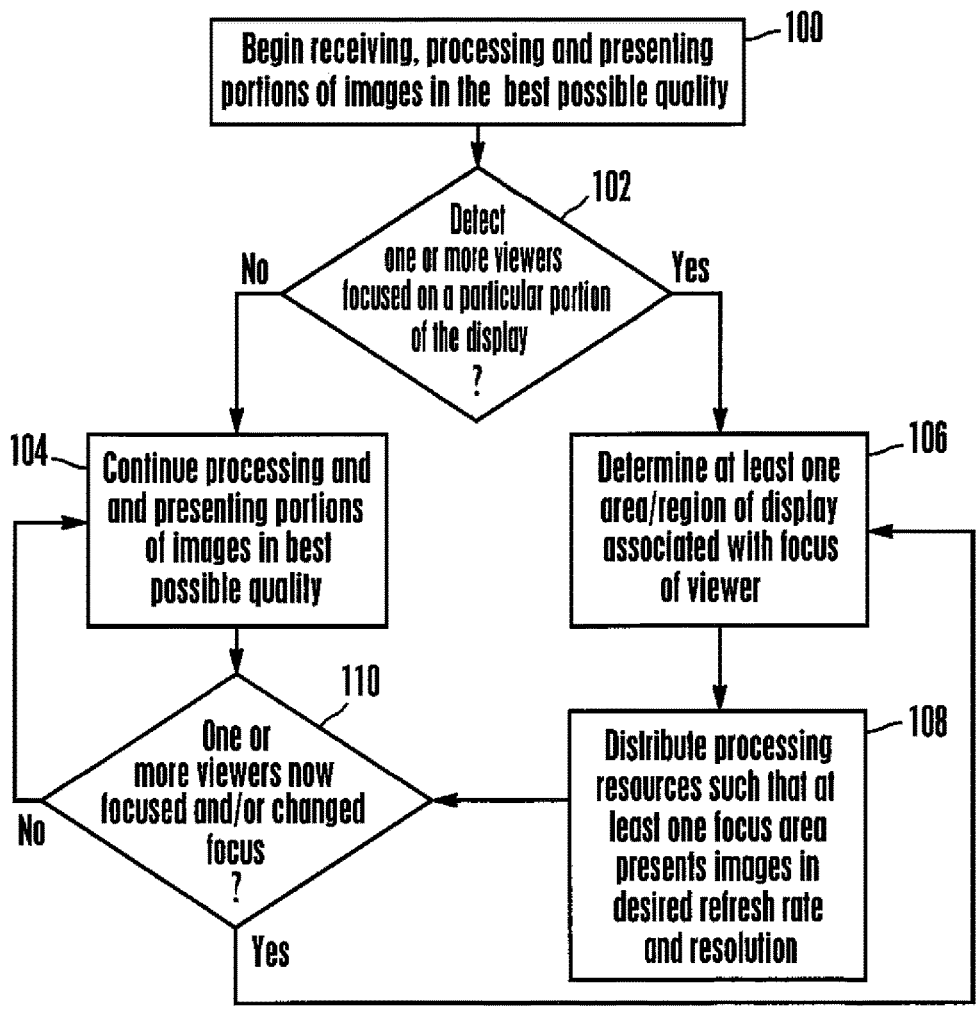
FIG. 5 is an exemplary flow chart of logic that may be used in accordance with present principles to determine a viewer's focus and process at last a portion of an incoming frame as fast and best as possible based on the focus.

Continuing the detailed description in reference to FIG. 5, it is to be understood that with larger screens and greater resolution such as high-definition and ultra high-definition (UHD) displays, the rate and amount of incoming video data (e.g., including the number of pixels for UHD displays) may be relatively voluminous. Furthermore, e.g., a relatively high refresh rate capability for the display may desirably entail that the incoming data should be processed as efficiently as possible to present the stream at the high refresh rate, or at least a portion of the stream in accordance with present principles.

Accordingly, FIG. 5 is an exemplary flow chart of logic that may be executed by a TV processor such as the processor 18 described above. Beginning at block 100, the logic begins by receiving and processing an incoming image stream (e.g., an AV program received through a STB) that may be a UHD stream in exemplary embodiments. At block 100 the logic presents as many of the portions each frame of the stream, and indeed the stream itself, in the best quality possible based on, e.g., the processing speed and capabilities of the TV's processor.

The logic then moves to decision diamond 102 where the logic detects whether the eyes of one or more viewers of the display are focused on one or more regions of the display based on input from a camera. If one or more viewers' eyes are not detected as being focused on a particular region (and/or if a focus cannot be detected/determined), the logic may proceed to block 104 where the logic continues to present as much of each frame of the stream in the best quality possible (e.g., decoding as many pixels as possible).

However, if at decision diamond 102 the focus of one or more viewers is detected, the logic proceeds to block 106. At block 106, the logic determines one or more regions of the display on which the viewer's eyes are (e.g., generally) focused based on the detecting. The region may be, e.g., centered around a focal point on the TV corresponding to the viewer's focus as determined by the TV, and furthermore the region may expand beyond the focal point, e.g. to a predefined radius or area that is a fraction of the total area of the display. After the determination at block 106, the logic then proceeds to block 108 where the logic distributes and/or allocates (e.g., responsive to the detecting) its image processing resources and/or capabilities such that the at least one region determined at block 106 presents the incoming stream (e.g., frames, an image stream, AV stream such as a television program, etc.) in the best possible quality (e.g., decoding it to render UHD quality resolution with a high screen refresh rate). Furthermore, at block 108 the processing capabilities may be distributed or allotted such that regions of the display outside of the viewer's region of focus may not present the incoming video image stream in UHD quality resolution but rather HD or standard definition (SD) quality, may not present a part of the frame or stream at all (e.g. by not decoding a portion of it), and/or may continue to present a frame that was previously processed while the region of focus has a subsequent frame presented thereon.

Before moving on, note that the detecting described herein may occur based on an image of an eye(s) received by the TV's processor from one of the cameras disclosed herein. The received image is then processed by the TV processor using image recognition to determine the angle of the viewer's eye(s) (e.g., based on the orientation of the pupils with respect to the white portions of the eye(s)) relative to, e.g., an axis defined by a direction between the viewer and the TV to thereby determine (e.g., estimate) the viewer's focus and/or direction of focus.

In addition, it is to be understood that the above-referenced distribution and/or allocation of processing resources (e.g., how much of different regions of a frame should be decoded) may be determined a number of ways. For instance, responsive to determining a center of a focus region/area, the logic may decode as much area in a frame period (e.g., $\frac{1}{32}$ of a second, or any other suitable frame period) as possible starting from the center of focal area and progressing outward therefrom such that, e.g., should the outer portions of the frame not be decoded in their entirety or at all before the next frame period, the area of the screen corresponding to where the frame was not entirely decoded may maintain and/or continue to present the prior image from a previous frame. As another example, responsive to determining a center of a focus region/area, the logic may decode images for a predetermined area size around the center of focus at one frame rate and decode images outside the predetermined area including the center of focus at a slower frame rate (e.g., $\frac{1}{16}$ of a second). As yet another example, responsive to determining a center of a focus region/area, the logic may decode all pixels in a predetermined area around the center of focus for an image and only a fraction of the pixels for the image outside the predetermined area.

Continuing in reference to FIG. 5, it is to be understood that after either of blocks 104 or 108 described above where all or part of the incoming video stream is presented on the TV/display device, the logic may optionally proceed to decision diamond 110. At decision diamond 110, the logic determines whether a change in the focus of (e.g., the eyes of) one or more viewers has been detected. If a change has been detected, the logic proceeds back to block 106 to determine a focus area and then at block 108 redistribute its processing resources to present the best frame/image quality at the new focal area for, e.g., subsequent frames/images to be presented on the display (or in some embodiments redistributes processing resources for a current frame/image being, e.g., decoded and presented). If a change is not detected at diamond 110, the logic instead proceeds back to 104 where the logic presents as much of the image/frame in the best quality possible.

Thus, as an example based on the foregoing description, a first portion of a frame/image presented on a top left region of the display may be decoded at a faster rate than a bottom right portion of the frame/image when the viewer's focus is detected as being on the top left region. Then, based on a change in, e.g., the viewer's focus to the bottom right portion of the display as detected by a camera (such as the TV camera 66 (e.g., capturing at least one image of the viewer's eyes from its position on a TV), tablet computer camera 70 (e.g., capturing at least one image of the viewer's eyes when juxtaposed in front of a viewer), and/or eyewear cameras 74 (e.g., capturing at least one image of the viewer's eyes when a viewer is wearing the eyewear)), a first portion of a subsequent frame/image presented on a top left region of the display may be decoded at a slower rate than a bottom right portion of the frame/image, which is decoded faster based on the determination that the bottom right portion is the portion to which the viewer's focus has changed.

Further still, note that in some embodiments, should a viewer's focus change while the TV processor is processing a particular frame/image, the distribution of processing resources may change to account for the change in focus such that, e.g., processing of the frame may begin at a faster rate for a first portion of the frame/image and a slower rate for a second portion, but then switch during the processing such the first portion is then processed slower than the second portion during the processing of the same single frame.

In addition, the above-described selective decoding in which portions of the video signal to be presented on the display are decoded to higher resolution than other portions may be disabled responsive to a determination that the viewer whose eyes are being tracked is at a threshold distance or further from the display. For example, the threshold distance may be twice the display width. This recognizes that as a viewer moves further from a display, less resolution is required for the entire display. Thus, when the viewer is at the threshold distance or greater from the display all of the video may be decoded at a relatively lower resolution, and once the viewer moves closer to the display within the threshold distance, the above-described logic in decoding portions of video at different resolutions is then invoked. Note that when a continuum of resolution is possible, instead of discrete resolutions (such as UHD, then HD, then SD), the resolution may be increased continuously linearly as the viewer moves toward the display and decreased continuously linearly as the viewer moves away from the display.

Moving on, exemplary display regions for a video display such as a TV are shown in FIGS. 6-12 where each figure includes at last one region including a viewer focal point in accordance with present principles, it being understood that the regions may be presented at different levels of image quality based on device capabilities. It is to be further understood that any of the regions and region shapes disclosed herein may be combined with each other.

Figure 6:
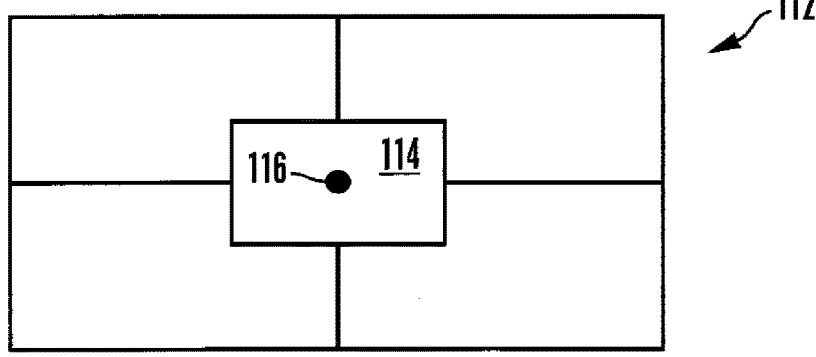
FIGS. 6-12 show exemplary display regions for a display that may be presented at different levels of image quality based on device capabilities and in which at least one region includes a focal point in accordance with present principles.

Beginning with FIG. 6, a display 112 is divided into plural regions including a rectangular focus region 114 that is generally central with respect to the display 112 and includes a focal point 116 where at least one viewer's eyes are determined to be focused. Note that there are four other regions included in the format 112, each extending into a corner of the display 112. These four regions may present images/frames at various levels of quality at or below the quality of presentation of images/frames presented within the focus region 114 depending on the display's processing capabilities generally or the capabilities available, e.g., at that time.

Figure 7:
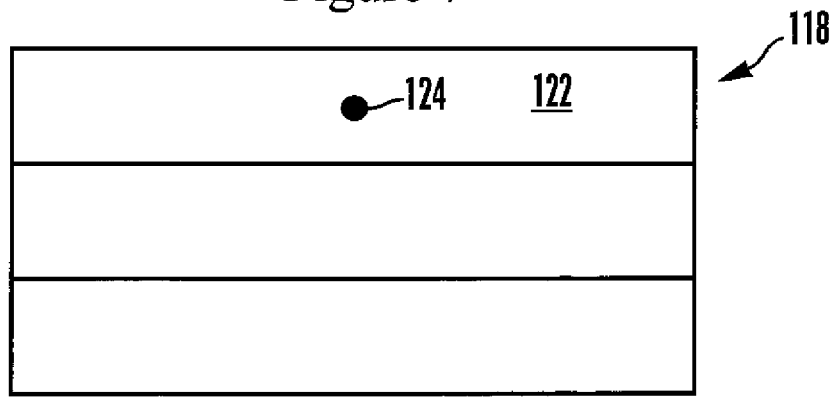
Figure 8:
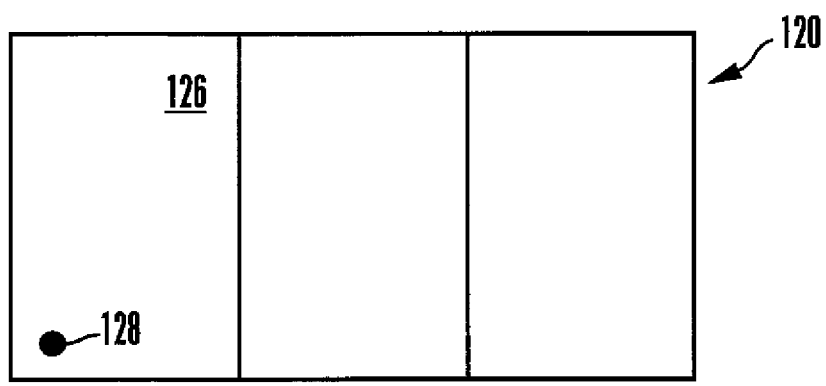

FIGS. 7 and 8 show displays 118 and 120, respectively, which are divided into rectangular thirds. FIG. 7 shows a focus region 122 that is in the upper portion of the display 118 and includes a focal point 124 where at least one viewer's eyes are determined to be focused. FIG. 8 shows a focus region 126 that is in the left portion of the display 120 and includes a focal point 128 where at least one viewer's eyes are determined to be focused. Note that the focal point 128 is not centrally located within in the focus region 126 but that the focus region 126 nonetheless occupies the left-most third of the display 120.

Figure 9:
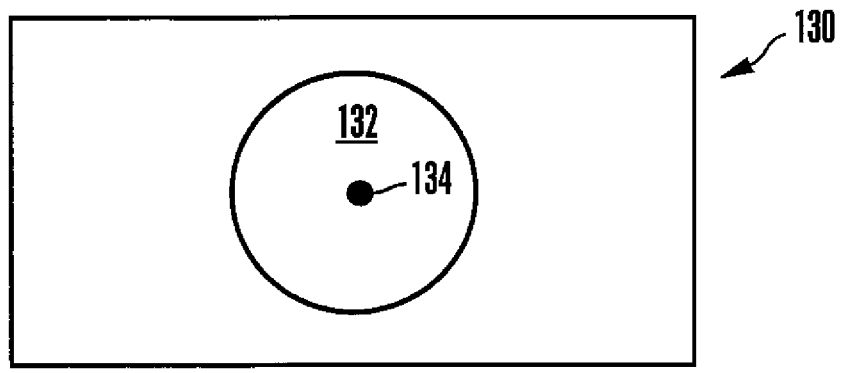

FIG. 9 shows a display 130 with a central, generally circular focus region 132 that includes a focal point 134 at the center thereof. The area of the focus region 132 may be based on, e.g., a radius extending from the focal point 134. It is to be understood that the radius may be predefined to be a certain length from the focal point 134, and/or such that a distance between the outermost portion of the region 132 and an edge of the display 130 is maintained (e.g., the closest edge to the region 132), and/or dynamically determined based on, e.g., the current and/or estimated processing capabilities of the display 130, the quality of the incoming image stream, etc.

Figure 10:
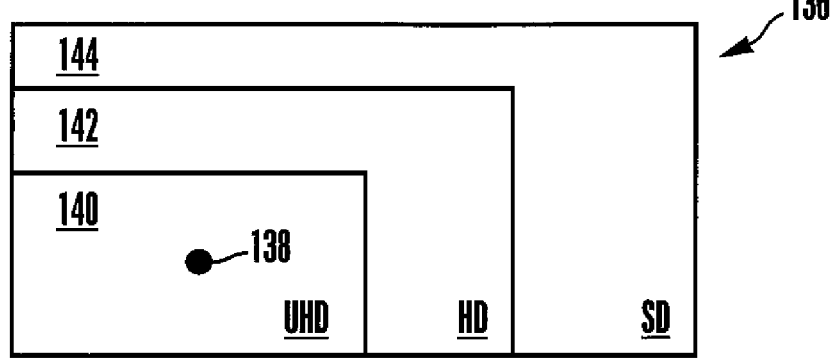

Now in reference to FIG. 10, a display 136 is shown and includes a focal point 138. A focus region 140 surrounds the focal point 138. It is understood that the focus region 140 shown in FIG. 10 may present images/frames in, e.g., UHD quality, in the best available resolution, and/or at the best possible refresh rate based on the capabilities of the display 136. A region 142 around the region 140 may also be determined based on the focal point 138, but owing to its portions being generally farther from the focal point 138 than the region 140, the region 142 presents frames/images in HD quality rather than UHD quality based limited display resources.

However, it is to be further understood that should the display 136 be able to present UHD quality images and/or the best possible refresh rate in the region 142 as well, then it may do so. The same can be said for the region 144. Should there be sufficient processing resources or allocation available to present UHD quality images and the best possible refresh rates in the region 144 after allocating an optimal amount to the regions 140 and 142, then it may do so rather than presenting, e.g., SD or HD quality images/frames in the region 144.

It may thus be generally appreciated based on the foregoing that in some embodiments, a first region closest to and surrounding a focal point may present UHD quality resolution and/or present frames/images at the best available refresh rate based on the display's processing capabilities, while the next-closest region to the focal point presents HD quality resolution and/or a lesser refresh rate, and a third region farthest from the focal point presents SD quality resolution and/or a relatively slow refresh rate. However, it is to be further understood that in some embodiments the closest and next-closest regions to the focal point may both present, e.g. (1) UHD quality resolution and the best possible refresh rate based on the displays capabilities, (2) UHD quality resolution for the closet region with HD quality for the next closest region while both presenting frames/images at the best possible refresh rate, and/or (3) both present UHD quality resolution while the closest region presents the frames/images at the best possible refresh rate while the next-closest region presents frames/images at a relatively slower refresh rate. Still other regions even further from the focal point(s) may present progressively less refined image/frame quality (e.g., SD) and/or present images/frames at a lesser refresh rate depending on the particular processing capabilities of the display at any given time. Thus, the quality of the frame/image being presented may be progressively less refined the farther the region is located from the focal point. As mentioned above, it may even be determined from the focal point and the distance to the viewer that the viewer is too far away to discern any of the higher quality frame/images. And, in that instance, no regional quality improvement would be offered.

Figure 11:
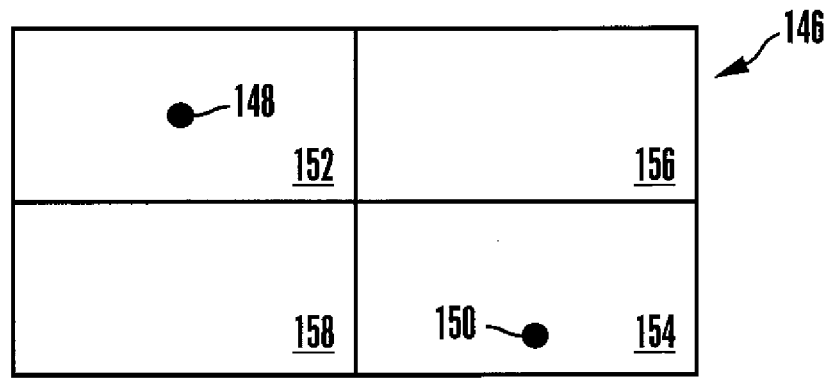

Now in reference to FIG. 11, two focal points 148, 150 are shown, each understood to be determined to be the estimated focal point of different viewers of the display 146. In accordance with present principles, focus regions 152, 154 for the focal points 148, 150 may present frames/images in the best possible resolution and/or refresh rate, while regions 156 and 158 may or may not depending on the processing capabilities of the display 146 (e.g., at that time). For completeness, note that present principles may also be applied when more than two viewers view a display as well.

Figure 12:
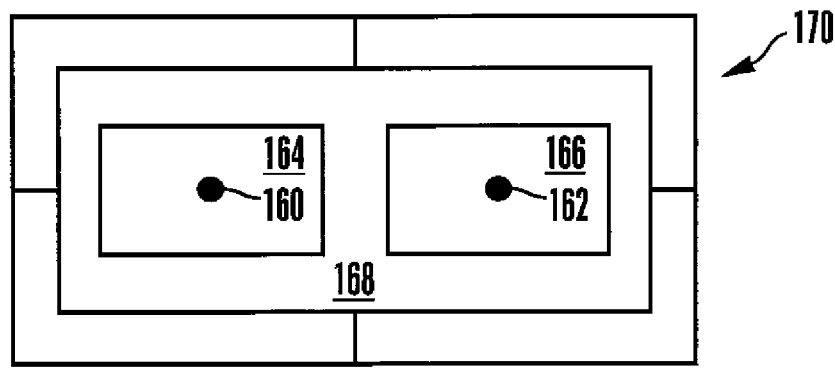

Continuing in reference to FIG. 12, two focal points 160, 162 are shown with respective focal regions 164, 166 surrounding them. In this exemplary embodiment, the regions 164, 166 do not overlap, but are still both encompassed by a relatively larger region 168. Accordingly, in this exemplary configuration, based on a determination by the display processor that it is possible to present the best quality resolution for frames/images, and/or present frames/images at the best possible refresh rate, in an area encompassing both the regions 164, 166, the display 170 does so. However, note that a similar determination may be made where focal regions for different focal points overlap at least to some degree. Regardless, note that there are also four outer regions on the display 170 extending to respective corners as well, which may only present frames/images in the best available resolution and/or refresh rate possible based on the remaining processing capabilities of the display 128 after allocating enough capabilities to present the best resolution and/or refresh rate in the region 168.

Based on the foregoing description, it may now be appreciated that a viewer's focus on a particular region of a display may be detected and used by, e.g., a TV's processor to determine which area of the display to process images/frames to be presented thereon, e.g., the best, fastest, etc., and thus control the TV's decoder accordingly. Present principles also recognize that, in addition to or in lieu of detecting a viewer's focus based on one or more images of the viewer's eyes, the cameras disclosed herein (e.g., the camera 66, 70, and 74) may be used to gather images on the angle of the viewer's head as well (as well as changes and movement of the head), and then determine a focus area based on the angle and tilt of a viewer's head relative to the TV. This might be especially important for large displays, e.g. made by aggregating multiple panels, where the viewer cannot see the entire image at one time. The viewer would be turning his or her head to an area of interest. Still further, in addition to or in lieu of the foregoing, the viewer may simply provide input to the TV processor indicating which region(s) of the display the viewer intends to focus on, and/or specifies at least one or more region(s) of the display the viewer desires to be processed the fastest, best, at the highest resolution possible, and/or fastest refresh rate possible.

Furthermore, it is to be understood that software code implementing any or all of the logic described herein may be executed by the processors described herein and may be stored in the computer readable storage mediums described herein, it being understood that present principles may be implemented by state logic as well as deterministic logic flows. Moreover, the figures described herein generally show methods steps in conjunction with the devices, apparatuses, and elements disclosed herein. It is to be further understood that present principles may be implemented in varying embodiments without one or more of the details described herein.

Accordingly, it is to be understood that the particular steps and sequences of steps described herein are exemplary and should not be read to limit the disclosure or the claims. Indeed, variations and combinations of the exemplary flow chart of FIG. 5 and exemplary regions shown in FIGS. 6-12 are understood to be within the scope of the present application. Therefore, it is to be understood that in some instances, the functions and logic steps described herein may occur out of the exemplary order shown in the figures.

While the particular PROCESSING VIDEO SIGNALS BASED ON USER FOCUS ON A PARTICULAR PORTION OF A VIDEO DISPLAY is herein shown and described in detail, it is to be understood that the subject matter which is encompassed by the present invention is limited only by the claims.

What is claimed is:

1. Apparatus comprising:
   at least one computer memory that is not a transitory signal and that comprises instructions executable by at least one processor to receive images from a camera of eyes of at least one viewer of a video display; and
   responsive to determining that the viewer is focused on a first region of the display, decode all pixels in a predetermined area around a center of the first region and decode only a fraction of pixels outside the predetermined area, the fraction being greater than zero.

2. The apparatus of claim 1, wherein the decoding of all pixels in the predetermined area establishes a first processing and the decoding of only a fraction of pixels outside the predetermined area establishes a second processing.

3. The apparatus of claim 2, wherein the first processing includes decoding a portion of the frame at a first rate and the second processing includes decoding a portion of the frame at a second rate different from the first rate.

4. The apparatus of claim 2, wherein the images indicate a viewer focus on a first region of the display, and the instructions are executable to, responsive to the images indicating a viewer focus on the first region, process the first portion of the frame using the first processing.

5. The apparatus of claim 4, wherein the instructions are executable to, responsive to a change in the viewer's focus from the first region to a second region determined from the images, process the second portion of a frame using the first processing and process the first portion of a frame using the second processing.

6. The apparatus of claim 2, wherein the frame is a first frame, and wherein the instructions are executable to, responsive to receiving additional images from the camera subsequent to processing the first portion of the first frame of video using the first processing, process a first portion of a second frame of video using the second processing and process a second portion of the second frame using the first processing, the first portion of the first frame and the first portion of the second frame both being presentable on a substantially similar area of the video display.

7. The apparatus of claim 2, wherein the instructions are executable to receive images of eyes of plural viewers of the video display, and wherein the instructions are executable to, responsive to receiving the images, process the first portion of the frame and a third portion of the frame using the first processing and process the second portion of the frame using the second processing.

8. The apparatus of claim 1, wherein the video display is a three-dimensional (3D) video display and the frame is a 3D frame.

9. Device comprising:
at least one computer memory that is not a transitory signal and that comprises instructions executable by at least one processor to:
present, on a video display, a first portion of demanded images in greater resolution or at a greater refresh rate than a second portion of the demanded images responsive to a determination that a viewer is focused on a first region of the video display corresponding to the first portion, the instructions being executable to execute at least one of the following:
responsive to determining that the viewer is focused on the first region, decode as much video data in a first frame period as possible starting from a center of the first region and progressing outward therefrom such that should outer portions of a frame not be entirely decoded before a next frame period, an area of the display corresponding to where the first frame is not entirely decoded presents an image from a frame previous to the first frame;
responsive to determining that the viewer is focused on the first region, decode all pixels in a predetermined area around a center of the first region and decode only a fraction of pixels outside the predetermined area, the fraction being greater than zero.

10. The device of claim 9, wherein the instructions are executable for presenting the first portion of the demanded images in greater resolution and at a greater refresh rate than the second portion of the demanded images responsive to the determination that a viewer is focused on a region of the video display corresponding to the first portion.

11. The device of claim 9, wherein the instructions are executable for presenting both the first portion of the demanded images and a third portion of the demanded images in greater resolution or at a greater refresh rate than the second portion of the demanded images responsive to a determination that the first viewer is focused on a region of the video display corresponding to the first portion and a second viewer is focused on a region of the video display corresponding to the third portion.

12. The device of claim 9, wherein the region is a first region, and wherein the instructions are executable to dynamically change processing of the demanded images in response to a change in viewer focus from the first region to a second region of the video display such that the second portion of the demanded images is presented in greater resolution or at a greater refresh rate than the first portion, the change in focus being directed to the second portion.

13. The device of claim 9, wherein the determination that the viewer is focused on the region of the video display corresponding to the first portion is based on input from a camera juxtaposed with the video display to generate images of the viewer's eyes, and/or the determination that the viewer is focused on the region of the video display corresponding to the first portion is based on input from a camera mounted on eyewear worn by the viewer to generate images of the viewer's eyes.

14. The device of claim 9, wherein the instructions are executable to:
responsive to determining that the viewer is focused on the first region, decode as much area in a first frame period as possible starting from a center of the first region and progressing outward therefrom such that should outer portions of a frame not be entirely decoded before a next frame period, an area of the display corresponding to where the first frame is not entirely decoded presents an image from a frame previous to the first frame.

15. The device of claim 9, wherein the instructions are executable to:
responsive to determining that the viewer is focused on the first region, decode all pixels in a predetermined area around a center of the first region and decode only a fraction of pixels outside the predetermined area.

16. Method comprising:
responsive to determining that a viewer of a video display is focused on a first region of the video display, decoding video data in a first frame period starting from a center of the first region and progressing outward therefrom such that should outer portions of a frame not be entirely decoded before a next frame period, an area of the video display corresponding to where the first frame is not entirely decoded presents an image from a frame previous to the first frame; and
presenting the video on the video display.

* * * * *